Oct. 10, 1961   J. S. HARDIGG   3,003,656
CUSHIONED CONTAINER UNIT
Filed April 22, 1958

INVENTOR
JAMES S. HARDIGG

BY Cushman, Darby & Cushman
ATTORNEYS

United States Patent Office 3,003,656
Patented Oct. 10, 1961

3,003,656
CUSHIONED CONTAINER UNIT
James S. Hardigg, Hamilton, Mass.
(58 Middle St., Hadley, Mass.)
Filed Apr. 22, 1958, Ser. No. 730,187
7 Claims. (Cl. 217—53)

This invention relates to cushioned shipping container units and to shock isolator elements therefor.

As disclosed in my copending application Serial No. 376,732, filed August 26, 1953, fragile articles may be protected for shipment by packaging in containers wherein pads or bodies of compressible cellular elastomeric material are interposed between the container and the article, or between the container and an inner container enclosing the article, the elastomeric bodies being firmly attached to both the outer container and the inner article or container. Each elastomeric body utilized in this manner provides elastic resistance to movement of the inner article or container relative to the outer container in every direction, functioning as a shock isolator element in compression, tension, or shear, or combination of shear and compression or tension. The principal advantages of this shock mounting, including superior cushioning and outstanding savings in weight, volume and cost, are described in detail in my prior application referred to.

It is an object of the present invention to provide an improved cushioned container unit involving the basic principle of my prior invention. In accordance with the present invention, elastomeric bodies are corner mounted between an outer container and an inner article or container in unique manner, whereby they function in shear to maximum degree. By this expedient, outstanding cushioning efficiency is attained, with maximum energy absorption per cubic inch of elastomeric material.

Another object of the invention is to provide an improved shock isolator element, comprising a body of elastomeric polyurethane foam resin and blocks of laminated corrugated fiberboard attached to opposite surfaces thereof. In accordance with preferred practice, the fiberboard blocks are arranged with some or all of their flutes disposed angularly, preferably at right angles, with respect to the resin body, and the resin is formed by foaming in place. This procedure permits venting of gases from the isocyanate-polyester reaction mixture through the flutes, whereby voids due to trapped gases are avoided in the foam resin body formed, and the resin penetrates the flutes of the fiberboard, resulting in bonded joints of exceeding strength. A related object is to provide a method of forming the shock isolator elements. A further object is to provide resilient shock isolator elements capable of absorbing shock forces of great intensity by crushing, without permanently and completely destroying their shock isolating function. Further objects will be in part evident and in part pointed out hereinafter.

The invention and the novel features thereof may best be made clear by reference to the following description and the accompanying drawing, in which FIGURE 1 is a top plan view of a preferred form of shipping container unit constructed in accordance with the present invention;

Figure 1:
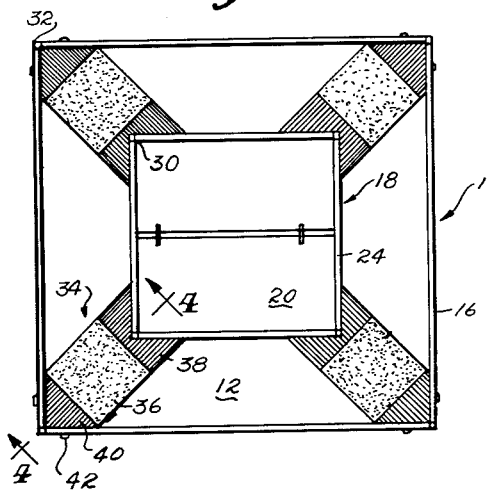
Figure 2:
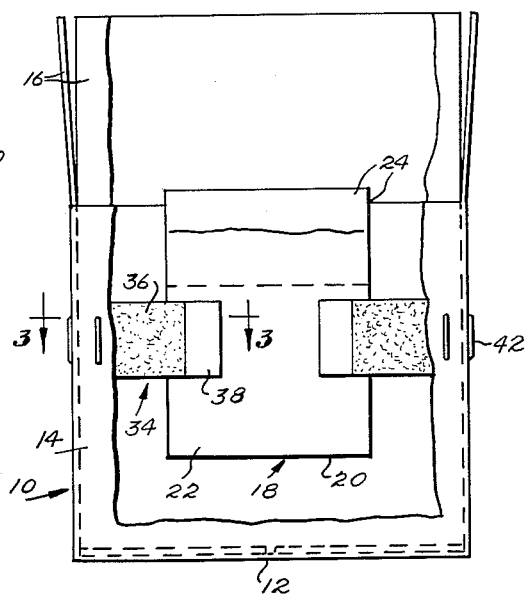
FIGURE 2 is a side elevational view of the unit of FIGURE 1, partly broken away for the sake of clarity.

Referring to the drawings, and in particular to FIGURES 1 and 2, an exemplary embodiment of the invention includes an outer container indicated generally as 10, which may be a conventional corrugated fiberboard carton including closed bottom 12, sides 14 and open top flaps 16. An inner container 18 is disposed within the outer container 10 and uniformly spaced therefrom on all sides. The inner container or article may also be a conventional corrugated fiberboard carton, including a closed bottom 20, sides 22 and open top flaps 24. In the preferred form, both containers are of square cross-sectional shape, each having sides of equal dimension.

Between each side corner edge 30 of inner container 18 and the corresponding side corner edge 32 of outer container 10 is mounted a shock isolator element indicated generally as 34. Each shock isolator element comprises a pad or body 36 of compressible cellular elastomeric material such as resilient polyurethane foam resin, although it will be understood that other materials such as sponge rubber may be used as well. The elastomeric body 36 is rectangular in form, and firmly attached to opposite surfaces thereof are an inner block 38 and an outer block 40 of laminated corrugated fiberboard. Preferably, the fiberboard blocks are attached to the resin body 36 by the inherent adhesion of foamed-in-place material, but may be attached also by gluing, mechanical connection or other conventional expedient. The blocks 38 and 40 are attached also, as by gluing, to the inner and outer containers 18 and 10, respectively. As illustrated in the drawings, the blocks 38 and 40 are wedge or V-shaped, respectively concave and convex, to conform to the associated container corner structure and provide an extensive area of contact therewith. For heavy duty applications, the glue joints between the blocks and the containers may be assisted by mechanical means such as staples 42.

Figure 5:
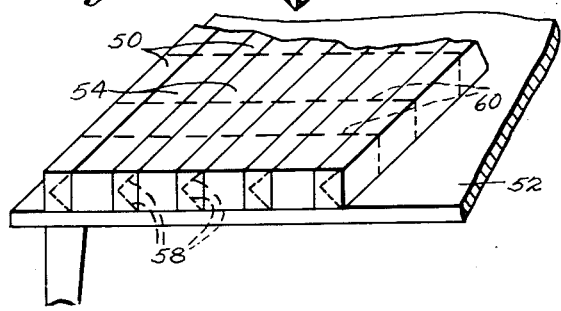
FIGURE 5 is a general perspective view illustrating a preferred method of manufacturing the shock isolator elements.

The shock isolator elements may be manufactured according to the preferred procedure described below. Laminated corrugated fiberboard may be purchased in large blocks, measuring for example 48" by 18" by 2⅝". The block product is customarily crosslaid, for maximum strength. Referring to FIGURE 5 of the drawing, a large block of laminated corrugated fiberboard as described may be sawed transversely into strips 50, which have the same length (48") and thickness (2⅝") as the original block and may be 1½" wide. The strips 50 are then arranged in parallel spaced relationship in a mold or on a flat surface, such as table 52, the spacing between strips being in accordance with the present example about 2½". Arranged on a flat surface, edge members may be positioned along the ends of the group of spaced strips, to provide end walls for the intervening spaces, and a reactive isocyanate-polyester mixture then poured into the spaces between the strips, to react and foam in place. A cover is customarily placed on top of the assembly after pouring the polyurethane mixture, and maintained in place until the foam has cured. In accordance with the simplified procedure described, the table 52 with end walls and a cover plate function together as a mold, to form intervening and appropriately shaped bodies 54 of resilient polyurethane resin between the fiberboard strips 50. As will be evident, equivalent mold structures may be employed to form the resin bodies 54. The foamed-in-place polyurethane resin adheres well to the fiberboard blocks in contact with which it is formed. The adherence may be enhanced by preliminarily coating the fiberboard blocks with suitable adhesive, and adherence of the foam resin to the mold elements may be prevented by preliminarily coating the mold with conventional anti-stick material.

If the laminated corrugated fiberboard is of conventional crosslaid type, and the strips 50 are sawed parallel to an edge of the original block, the flutes of at least some of the fiberboard layers will extend in direction normal to the cut planes, and accordingly normal to the resin formed between adjacent strips. This circumstance has been found to be highly advantageous for optimum resin-fiberboard bond and maximum strength of the shock isolator elements. As is well known, the polyurethane resin mixture tends to form gas bubbles along its surfaces during foaming. It has been found that in the present case the angularly disposed flutes effectively vent the reaction mixture, permitting egress of gas formed adjacent the fiberboard blocks, and thereby preventing the formation of voids in the foam resin due to trapped gases and the like. A further advantage of this venting is involved in the circumstance that the resin when foamed in this manner penetrates a short distance, usually about ¼", into the flutes of the fiberboard, effecting a mechanical interlock between the resin and the fiberboard blocks. To take advantage of this action, if the laminated corrugated fiberboard used is not crosslaid, it should be cut into strips across the flutes, so that all flutes will be normal to the cut planes.

Figure 3:
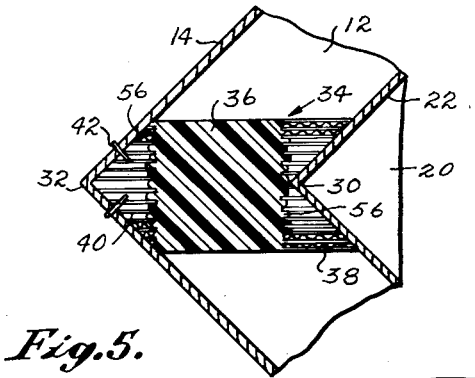
FIGURE 3 is a sectional plan view taken on the line 3—3 of FIGURE 2, illustrating the structure of one shock isolator element of the container unit.
Figure 4:
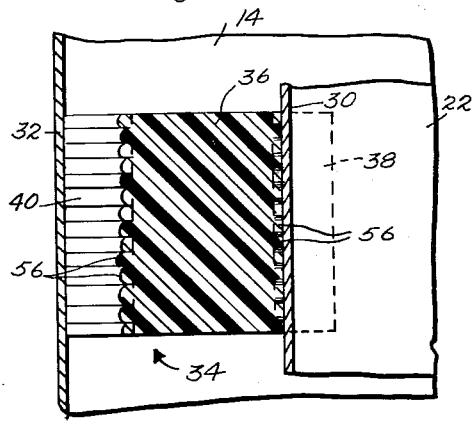
FIGURE 4 is a sectional elevational view taken on the line 4—4 of FIGURE 1.

As illustrated in FIGURES 3 and 4, the fiberboard blocks 38 and 40 are formed of a plurality of layers of corrugated fiberboard laminated together. The flutes of the outer two layers on each side are disposed parallel to the side corner edges 30 and 32 of the containers, and the flutes of the remaining central layers are disposed at right angles thereto, and accordingly at right angles to the resin bodies 36. As shown in the drawings, the resin bodies 36 extend into the normally disposed flutes, as at 56, effecting joints of outstanding strength.

After the polyurethane resin has been foamed in place between the fiberboard strips 50 in the manner described, the assembly may be cut by means of a saw along the dotted lines 58 (see FIG. 5). This operation produces elongated shock isolator element strips, each including a central body of resilient polyurethane resin having wedge-shaped fiberboard blocks firmly attached to opposite sides thereof, the blocks being V-shaped, respectively convex and concave. The shock isolator element strips may then be cut transversely as along dotted lines 60 to desired size, the final elements being dimensioned in accordance with the weight of the object or article to be protected. As will be understood, by the procedure described the shock isolator elements may be produced in quantity, with maximum utilization of material, in elongated strips. The elongated strips may then be cut to desired sizes, to provide isolator elements having a wide range of shock absorbing capacity.

In assembling the container units of FIGURES 1 and 2, the inner and outer containers initially may be completely assembled with bottoms closed and tops open. By one procedure, the inner corners of the outer container and the outer corners of the inner container may be prime coated with adhesive, and all bonding surfaces of the shock isolator elements similarly prime coated and permitted to dry. Immediately prior to assembly, the bonding surfaces of the inner blocks 38 of the shock isolator elements are again coated with adhesive, and the shock isolator elements then positioned against the outside corners of the inner container 18. The tackiness of the adhesive will ordinarily hold the isolator elements in place, but staples may be driven through the inner container into the blocks 38 to insure good contact of the glue.

The bonding surfaces of the outer blocks 40 may then be again coated with glue, and the assembly of the inner container and the four shock isolator elements then positioned in the outer container. A small removable stop may be used to limit the relative downward travel of the inner container, and position it appropriately relative to the outer container. Desirably, the foamed resin bodies 36 of the shock isolator elements are slightly compressed in assembly. The resultant pressure on the outer container ordinarily will maintain the assembly in place until the adhesive dries or sets, and staples 42 may be applied to insure perfect mating and contact with the outer container while the glue is setting up.

When the joints between the shock isolator elements and the containers have set, the article to be protected may be placed in the inner container 18, and the inner container then closed, whereupon the outer container may also be closed. Both containers may be temporarily closed, if desired, for shipment empty to the point of use. If the article to be protected is itself of appropriate nature and form, the inner container 18 may be dispensed with, and the shock isolator elements positioned between the outer container and the article itself, and adhered to both.

The corner mounting of the shock isolator elements in the container unit has proved to be exceedingly efficient, and to provide cushioning far superior to that attainable with compression cushioning materials. The corner mounting permits the use of elastomeric bodies of minimum size, and accordingly of outer containers of minimum overall size. In the event of a flat drop on one of the four side faces of the outer container, the shock isolators below the inner container or article are loaded with a combination of compression and shear, and the two upper isolators with a combination of tension and shear. In a flat drop on either the top or bottom of the outer container, all four isolators operate in pure shear, in which case the cushioning effect is at a maximum. Accelerometer tests indicate that the total cushioning effect of the corner mounted arrangement is superior to that attainable with other arrangements.

A performance advantage offered by the corrugated fiberboard is that if the package is dropped on a side face from an excessive height, the corrugated fiberboard blocks in contact with the inner container can crush, and absorb the shock to the degree that the shock transmitted to the packaged article is still quite low. In such case, although damage is done to the shock isolators, the packaged article is yet protected from damage resulting from shock greatly exceeding the design value. As will be evident, the cushioned container unit is adapted for reuse, and in normal service may be utilized for several shipments.

It will thus be seen that there has been provided by this invention articles and methods in which the various objects hereinbefore set forth, together with many practical advantages, are successfully achieved. As various possible embodiments may be made of the novel features of the above invention, all without departing from the scope thereof, it is to be understood that all matter hereinbefore set forth is to be interpreted as illustrative and not in a limiting sense.

What is claimed is:

1. A cushioned shipping container unit comprising an outer container with four sides defining a rectangular cross-sectional form, an inner container of smaller size and corresponding form disposed within said outer container and completely spaced therefrom, and shock isolator elements interposed between corresponding side corner edges of said outer and inner containers, each of said shock isolator elements comprising a body of compressible cellular elastomeric material and blocks of laminated corrugated fiberboard firmly attached to opposite surfaces thereof, the fiberboard blocks of each shock isolator element being firmly attached to said outer container and to said inner container whereby said shock isolator elements provide elastic resistance to movement of said inner container relative to said outer container in every direction.

2. A cushioned shipping container unit as defined in claim 1, wherein said elastomeric material is a foamed-in-place polyurethane resin.

3. A cushioned shipping container unit as defined in claim 1, wherein at least some of the flutes of each fiberboard block are angulated with respect to the attached elastomeric material, and said material extends into said flutes.

4. A shock isolator element comprising a body of compressible cellular elastomeric material, and blocks of laminated corrugated fiberboard firmly attached to opposite surfaces of said body.

5. A shock isolator element as defined in claim 4, wherein said elastomeric material is a foamed-in-place polyurethane resin.

6. A shock isolator element as defined in claim 4, wherein at least some of the flutes of said fiberboard are angulated with respect to said body, and said body extends into said flutes.

7. A shock isolator element comprising a body of elastomeric polyurethane resin, and wedge shaped blocks of laminated corrugated fiberboard firmly attached to opposite surfaces of said body, at least some of the flutes of each fiberboard block being disposed normal to said body, said body extending into said normally disposed flutes.

References Cited in the file of this patent

UNITED STATES PATENTS

| | | |
|---|---|---|
| 2,299,355 | Stolpman | Oct. 20, 1942 |
| 2,376,530 | Dittmann | May 22, 1945 |
| 2,516,124 | Kishibay | July 25, 1950 |
| 2,780,350 | Simon et al. | Feb. 5, 1957 |
| 2,785,739 | McGregor et al. | Mar. 19, 1957 |
| 2,867,367 | Butz | Jan. 6, 1959 |

FOREIGN PATENTS

| | | |
|---|---|---|
| 12,358 | Great Britain | 1910 |
| 662,242 | Great Britain | Dec. 5, 1951 |
| 1,078,549 | France | May 12, 1954 |